US009686329B2

(12) United States Patent
Si (10) Patent No.: US 9,686,329 B2
(45) Date of Patent: Jun. 20, 2017

(54) METHOD AND APPARATUS FOR DISPLAYING WEBCAST ROOMS

(71) Applicant: TENCENT TECHNOLOGY (SHENZHEN) COMPANY LIMITED, Shenzhen (CN)

(72) Inventor: Wenxin Si, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 251 days.

(21) Appl. No.: 14/256,966

(22) Filed: Apr. 20, 2014

(65) Prior Publication Data

US 2014/0344286 A1  Nov. 20, 2014

Related U.S. Application Data

(63) Continuation of application No. PCT/CN2013/089053, filed on Dec. 11, 2013.

(30) Foreign Application Priority Data

May 17, 2013  (CN) .......................... 2013 1 01857807

(51) Int. Cl.
*G06F 17/30*        (2006.01)
*H04L 29/06*        (2006.01)

(52) U.S. Cl.
CPC ...... *H04L 65/4038* (2013.01); *H04L 65/4076* (2013.01); *G06F 17/30289* (2013.01); *G06F 17/30864* (2013.01)

(58) Field of Classification Search
CPC ............ H04N 21/812; H04N 21/2668; H04N 21/4667; G06F 1/163; G06F 17/3223; G06F 17/30289; G06F 17/30864

(Continued)

(56) References Cited

U.S. PATENT DOCUMENTS 6,438,450 B1 *  8/2002  DiLorenzo ............. H04H 20/63
                                                    348/E7.071
7,272,657 B2 *  9/2007  Allen .................. H04L 12/1822
                                                    709/228

(Continued)

FOREIGN PATENT DOCUMENTS

CN        101686249 A       3/2010
CN        102033929 A       4/2011
                  (Continued)

OTHER PUBLICATIONS

Method and System for Sequencing Searched Network Videos CN 102880712 B, Oct. 8, 2012, Google, 6 Pages.*

(Continued)

*Primary Examiner* — Frantz Coby
(74) *Attorney, Agent, or Firm* — Anova Law Group, PLLC (57) ABSTRACT

Methods and apparatus for displaying webcast rooms are provided therein. An exemplary method can be implemented by a computer system. A weight corresponding to each webcast room of a plurality of webcast rooms and an anchor-account weight corresponding to an anchor account of the each webcast room of the plurality of webcast rooms can be obtained. The weight corresponding to the each webcast room and the anchor-account weight can be pre-stored. A webcast room to be displayed can be determined from the plurality of webcast rooms, according to the weight corresponding to the each webcast room and the anchor-account weight. The webcast room to be displayed can be displayed.

20 Claims, 5 Drawing Sheets

(58) Field of Classification Search
USPC ....... 707/736, 748, 752, 753, 805, 709, 710; 709/204, 206, 231; 340/286, 1, 286.01; 725/109; 717/104
See application file for complete search history.

(56) References Cited

U.S. PATENT DOCUMENTS

| | | | | |
|---|---|---|---|---|
| 8,046,697 | B2* | 10/2011 | Stern | G06F 17/30899 715/745 |
| 8,239,905 | B2* | 8/2012 | Li | G06Q 10/00 725/109 |
| 8,312,090 | B2* | 11/2012 | Anderson | G06Q 10/10 709/206 |
| 8,346,589 | B1* | 1/2013 | Norton | G06Q 10/1093 705/7.18 |
| 8,355,040 | B2* | 1/2013 | Trachtenberg | H04N 7/142 348/14.09 |
| 8,852,002 | B2* | 10/2014 | Kang | G07F 17/3223 463/25 |
| 8,862,764 | B1* | 10/2014 | Garcia-Barrio | G06F 1/163 709/231 |
| 8,868,669 | B2* | 10/2014 | Anderson | G06Q 10/10 709/206 |
| 8,966,436 | B2* | 2/2015 | Pryhuber | G06F 9/44505 717/104 |
| 8,990,223 | B2* | 3/2015 | Melnychenko | G06F 17/3053 707/748 |
| 9,098,193 | B2* | 8/2015 | Stoneham | H04H 60/04 |
| 2003/0035386 | A1* | 2/2003 | Sullivan | H04B 7/18584 370/316 |
| 2003/0195853 | A1* | 10/2003 | Mitchell | G06F 9/468 705/51 |
| 2003/0236908 | A1* | 12/2003 | Khang | H04B 7/18523 709/231 |
| 2005/0125453 | A1* | 6/2005 | Rozack | H04L 29/06027 |
| 2006/0184977 | A1* | 8/2006 | Mueller | H04H 20/38 725/86 |
| 2007/0078768 | A1* | 4/2007 | Dawson | H04N 7/17318 705/50 |
| 2007/0300165 | A1* | 12/2007 | Haveliwala | G06F 3/0482 715/758 |
| 2008/0192736 | A1* | 8/2008 | Jabri | G11B 27/034 370/352 |
| 2008/0263585 | A1* | 10/2008 | Gell | H04N 7/15 725/32 |
| 2009/0009605 | A1* | 1/2009 | Ortiz | H04N 5/232 348/157 |
| 2009/0134980 | A1* | 5/2009 | Katz | G09F 15/005 340/286.01 |
| 2009/0248491 | A1* | 10/2009 | Hemphill | G06Q 30/02 705/7.29 |
| 2010/0205988 | A1* | 8/2010 | Jiang | F25B 1/10 62/225 |
| 2010/0257268 | A1* | 10/2010 | Landry | G09B 23/28 709/225 |
| 2010/0318916 | A1* | 12/2010 | Wilkins | G06F 3/14 715/730 |
| 2011/0196928 | A1* | 8/2011 | Pryhuber | H04N 7/15 709/204 |
| 2011/0271210 | A1* | 11/2011 | Jones | H04L 12/1827 715/753 |
| 2012/0290950 | A1* | 11/2012 | Rapaport | H04L 51/32 715/753 |
| 2012/0327099 | A1* | 12/2012 | Vojak | G09G 5/14 345/581 |
| 2014/0222702 | A1* | 8/2014 | Jennings | G06Q 50/01 705/319 |
| 2015/0172372 | A1* | 6/2015 | Garcia-Barrio | G06F 1/163 709/219 |

FOREIGN PATENT DOCUMENTS

| | | |
|---|---|---|
| CN | 102457780 A | 5/2012 |
| CN | 102880712 A | 1/2013 |

OTHER PUBLICATIONS

The World Intellectual Property Organization (WIPO) International Search Report for PCT/CN2013/089053 Mar. 20, 2014.
The State Intellectual Property Office of the People's Republic of China (SIPO) Office Action 1 for 201310185780.7 Apr. 12, 2016.

* cited by examiner

METHOD AND APPARATUS FOR DISPLAYING WEBCAST ROOMS

CROSS-REFERENCES TO RELATED APPLICATIONS

This application is a continuation application of PCT Patent Application No. PCT/CN2013/089053, filed on Dec. 11, 2013, which claims priority to Chinese Patent Application No. 201310185780.7, filed on May 17, 2013, the entire contents of all of which are incorporated herein by reference.

FIELD OF THE DISCLOSURE

The present disclosure generally relates to Internet technology and, more particularly, relates to methods and apparatus for displaying webcast rooms.

BACKGROUND

With the development of computer and Internet technology, interactive media broadcast using webcast has been continuously developed and become widespread. A network anchor can perform video or audio playback in a webcast room. After entering the webcast room, a user can watch video or listen to audio, and can interact in various forms such as chatting.

In communication software including a webcast-room function, a function to display a webcast room is usually provided. For example, after a user clicks on a corresponding button, a classification-recommendation window opens, and a list of webcast rooms recommended to the user is displayed in the classification-recommendation window. The list of webcast rooms recommended to the user is set by server-side administrative staff. A server displays the various webcast rooms in the list, i.e., sends relevant information of the various webcast rooms to a terminal for displaying.

Existing technology has at least the following problems. For example, the webcast rooms recommended to the user are preset by server-side administrative staff, and are not updated in real time. In addition, difference between anchors in the webcast rooms can often directly affect whether the webcast rooms can match the user's needs. As a result, because of the anchors, recommended webcast rooms can sometimes only match the needs of a small number of users. Thus, a large number of users enter and exit the webcast rooms, and significant network resources and server resources may be wasted.

BRIEF SUMMARY OF THE DISCLOSURE

One aspect of the present disclosure includes a method for displaying webcast rooms. An exemplary method can be implemented by a computer system. A weight corresponding to each webcast room of a plurality of webcast rooms and an anchor-account weight corresponding to an anchor account of the each webcast room of the plurality of webcast rooms can be obtained. The weight corresponding to the each webcast room and the anchor-account weight can be pre-stored. A webcast room to be displayed can be determined from the plurality of webcast rooms, according to the weight corresponding to the each webcast room and the anchor-account weight. The webcast room to be displayed can thus be displayed.

Another aspect of the present disclosure includes an apparatus for displaying webcast rooms. An exemplary apparatus can include an obtaining module, a determination module, and a display module. The obtaining module can be configured to obtain a weight corresponding to each webcast room of a plurality of webcast rooms and an anchor-account weight corresponding to an anchor account of the each webcast room of the plurality of webcast rooms. The weight corresponding to the each webcast room and the anchor-account weight can be pre-stored. The determination module can be configured to determine a webcast room to be displayed from the plurality of webcast rooms, according to the weight corresponding to the each webcast room and the anchor-account weight. The display module can be configured to display the webcast room to be displayed.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the disclosure.

DETAILED DESCRIPTION

Reference will now be made in detail to exemplary embodiments of the disclosure, which are illustrated in the accompanying drawings.

Figure 6:
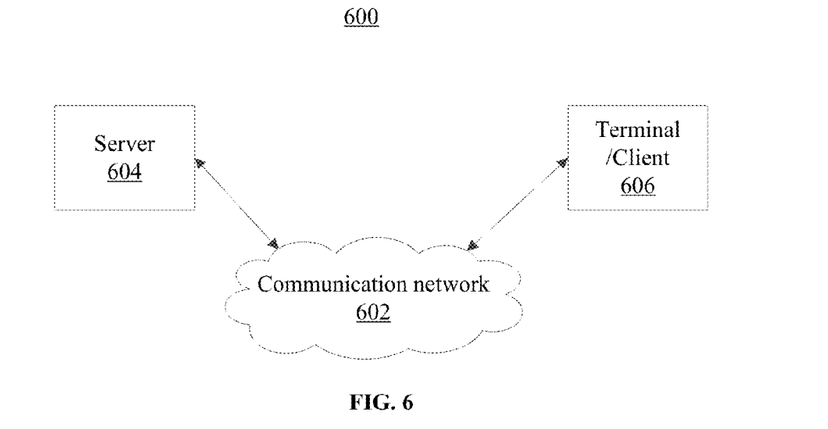
FIG. 6 depicts an exemplary environment incorporating certain disclosed embodiments.

FIG. 6 depicts an exemplary environment 600 incorporating exemplary methods and apparatus for displaying webcast rooms in accordance with various disclosed embodiments. As shown in FIG. 6, the environment 600 can include a server 604, a terminal 606, and a communication network 602. The server 604 and the terminal 606 may be coupled through the communication network 602 for information exchange including, e.g., sending/receiving video/audio data, sending/receiving information of webcast rooms, etc. Although only one terminal 606 and one server 604 are shown in the environment 600, any number of terminals 606 or servers 604 may be included, and other devices may also be included.

The communication network 602 may include any appropriate type of communication network for providing network connections to the server 604 and terminal 606 or among multiple servers 604 or terminals 606. For example, the communication network 602 may include the Internet or other types of computer networks or telecommunication networks, either wired or wireless.

A terminal, as used herein, may refer to any appropriate user terminal with certain computing capabilities, e.g., a personal computer (PC), a work station computer, a handheld computing device (e.g., a tablet), a mobile terminal (e.g., a mobile phone or a smart phone), or any other client-side computing device.

A server, as used herein, may refer to one or more server computers configured to provide certain server functionalities, e.g., receiving/forwarding video/audio data, storing weights of webcast rooms and anchor accounts, sorting webcast rooms, sending information of webcast rooms, etc. A server may also include one or more processors to execute computer programs in parallel.

Figure 7:
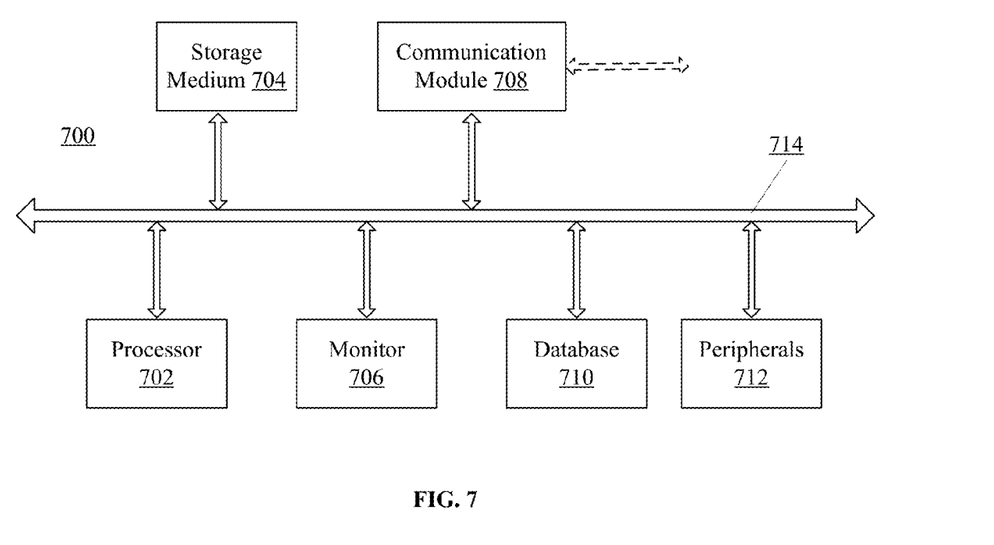
FIG. 7 depicts an exemplary computing system consistent with the disclosed embodiments.

The server 604 and the terminal 606 may be implemented on any appropriate computing platform. FIG. 7 shows a block diagram of an exemplary computing system 700 (or computer system 700) capable of implementing the server 604 and/or the terminal 606. As shown in FIG. 7, the exemplary computer system 700 may include a processor 702, a storage medium 704, a monitor 706, a communication module 708, a database 710, peripherals 712, and one or more bus 714 to couple the devices together. Certain devices may be omitted and other devices may be included.

The processor 702 can include any appropriate processor or processors. Further, the processor 702 can include multiple cores for multi-thread or parallel processing. The storage medium 704 may include memory modules, e.g., Read-Only Memory (ROM), Random Access Memory (RAM), and flash memory modules, and mass storages, e.g., CD-ROM, U-disk, removable hard disk, etc. The storage medium 704 may store computer programs for implementing various processes (e.g., sorting webcast rooms, determining weights for webcast rooms and anchor accounts, pre-storing various lists, etc.), when executed by the processor 702.

The monitor 706 may include display devices for displaying contents in the computing system 700, e.g., displaying information of webcast rooms. The peripherals 712 may include I/O devices such as keyboard and mouse.

Further, the communication module 708 may include network devices for establishing connections through the communication network 602. The database 710 may include one or more databases for storing certain data and for performing certain operations on the stored data, e.g., storing and managing weights of webcast rooms, anchor-account weights, webcast-room list, and account list, or any other suitable data calculation and management operations.

In operation, the terminal 606 may cause the server 604 to perform certain actions, e.g., receiving video/audio data from a terminal, forwarding video/audio data to a terminal, sending information of webcast rooms to a terminal, etc. The server 604 may be configured to provide structures and functions for such actions and operations.

In various embodiments, a terminal involved in the disclosed methods and systems can include the terminal 606, while a server involved in the disclosed methods and systems can include the server 604. The methods and systems disclosed in accordance with various embodiments can be executed by a computer system. In certain embodiments, the disclosed methods and systems can be implemented by a server.

Figure 1:
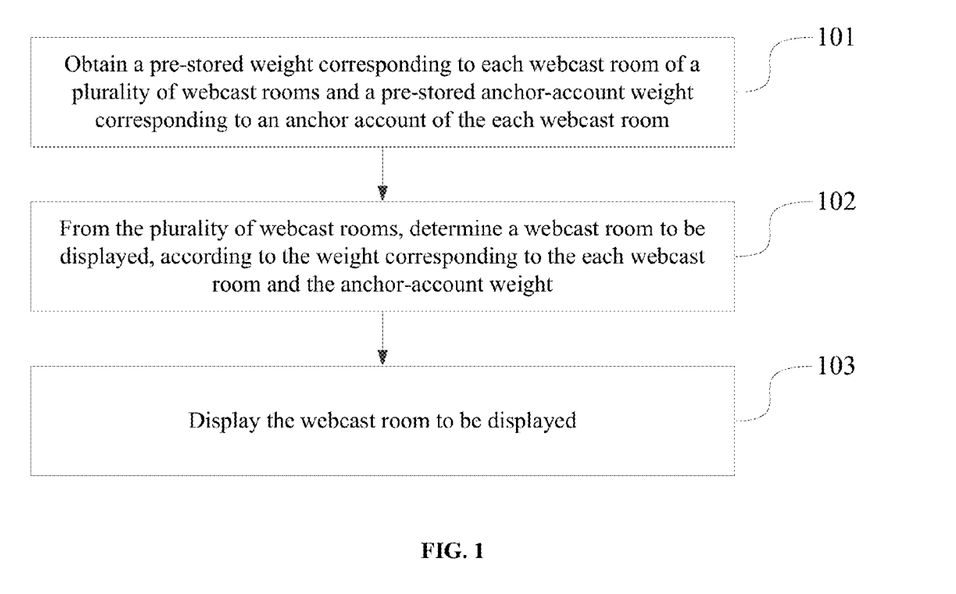
FIG. 1 depicts a flow diagram of an exemplary method for displaying webcast rooms in accordance with various disclosed embodiments.

Various embodiments provide methods and apparatus for displaying webcast rooms. As used herein, wherever applicable, webcast can refer to any form of presentation distributed over the Internet or other types of computer networks or telecommunication networks to distribute a single content source to many simultaneous listeners and/or viewers. A webcast room can refer to a virtual room having listeners, viewers, and/or anchors, to share information via webcast. FIG. 1 depicts a flow diagram of an exemplary method for displaying webcast rooms in accordance with various disclosed embodiments. As shown in FIG. 1, the method can include the following exemplary steps.

In Step 101, pre-stored weights corresponding to webcast rooms and pre-stored weights corresponding to anchor accounts of the webcast rooms are obtained. In various embodiments, a weight corresponding to each webcast room of a plurality of webcast rooms and an anchor-account weight corresponding to an anchor account of the each webcast room of the plurality of webcast rooms can be obtained. The weight corresponding to the each webcast room and the anchor-account weight can be pre-stored.

In Step 102, according to the weights corresponding to the webcast rooms and the weights corresponding to the anchor accounts of the webcast rooms, webcast room(s) to be displayed are determined from the webcast rooms. In Step 103, the webcast room(s) to be displayed are displayed.

Depending on the implementation of Step 102, the webcast room(s) to be displayed can include one or more webcast rooms, without limitation. For illustrative purposes, in certain embodiments depicted in the present disclosure, the webcast room(s) to be displayed can include more than one webcast rooms.

As used herein, unless otherwise specified, for each webcast room, a weight corresponding to an anchor account can also be referred to as an 'anchor-account weight'. Accordingly, a weight corresponding to an anchor account of the webcast room can also be referred to as an anchor-account weight corresponding to an anchor account of the webcast room, or an 'anchor-account weight' of the webcast room.

In various embodiments, when the webcast rooms to be displayed are determined according to the weights corresponding to the webcast rooms and the anchor-account weights of the webcast rooms, e.g., as in Step 102, the webcast rooms can be sorted to generate a sequence. As used herein, when webcast room A precedes webcast room B, i.e., when webcast B follows webcast room A in the sequence, webcast room A is more 'in the front' of the sequence than webcast room B, or more 'in the beginning' of the sequence than webcast room B.

The webcast rooms to be displayed obtained by determining, e.g., as in Step 102, can include a preset number of the webcast rooms at a front (or top, or beginning) of the sequence. The preset number can be any suitable number according to needs of practical applications.

In various embodiments, when the webcast rooms to be displayed are displayed, e.g., as in Step 103, the webcast rooms to be displayed can be displayed in a webcast-room-recommendation list. Optionally, the webcast-room-recommendation list may indicate the order of the webcast rooms to be displayed in the sequence, e.g., via relative positioning of the webcast rooms on the display screen, sequence number indicating the order of the webcast rooms, or any other suitable means.

As disclosed herein, according to the weights corresponding to the webcast rooms and the anchor-account weights of the webcast rooms, webcast room(s) to be displayed can be determined from the webcast rooms and can be displayed. Thus, a webcast-room-recommendation list can be timely updated according to the anchor accounts of the webcast rooms. In addition, because pre-stored lists and weights can be used, the updating of the webcast-room-recommendation list can be easy and does not require significant work by staff. A webcast room having a great weight and having an anchor account with great weight is more likely to be included in the webcast-room-recommendation list. Thus, frequency of users' entering and exiting the webcast rooms can be reduced, thus reducing waste of network resources and server resources.

Various embodiments further provide methods for displaying webcast rooms, and the methods can be implemented by a server, e.g., a server installed with communication software configured with a webcast-room function.

For example, the server can pre-store weights corresponding to webcast rooms. Weights can be set in advance for part or all of the webcast rooms recorded by the server. In various embodiments, the server can record locally-established webcast rooms and/or webcast rooms established on other servers. For webcast rooms without weights being set, the server can store the weights as a default null value (a fixed value, e.g., 0), or the server does not store the weights of such webcast rooms. The weights corresponding to the webcast rooms can be set according to needs of practical applications.

The weights can be set for the webcast rooms according to factors including, e.g., number of online people in the webcast rooms, evaluation for the webcast rooms by administrative staff, popularity of software associated with the webcast rooms (e.g., a certain game associated with a webcast room), etc.

For example, the webcast rooms can be classified into general webcast rooms and key webcast rooms. A general webcast rooms can have a weight set to be 100, i.e., a weight of 100. A key webcast rooms can have a weight of 200. Greater values can be set for weights according to other factors. In addition, when some large-scale activities are organized, during a short term, high weights, e.g., 500, can be set for webcast rooms related to the activities.

The server can also pre-store weights corresponding to anchor accounts, i.e., anchor-account weights. The anchor-account weights can be set in advance for part or all of the anchor accounts that are registered and are recorded by the server. In various embodiments, the anchor accounts can be registered locally on the server or registered on other servers. For anchor accounts without weights being set, the server can store the anchor-account weights as a default null value (a fixed value, e.g., 0), or the server does not store the weights of such anchor accounts. The anchor-account weights can be set according to needs of practical applications, e.g., can be set based on parameters including, e.g., ratings, reviews. etc.

The weights can be set for the anchor accounts according to factors including, e.g., number of online people corresponding to the anchor accounts, evaluation for the anchor accounts by administrative staff, number of gifts sent to the anchor accounts by online users, etc.

For example, the anchor accounts can be classified into general anchor accounts and senior anchor accounts. A general anchor accounts can have a weight of 100. A senior anchor accounts can have a weight of 500. Greater values can be set for weights according to other factors. In addition, when some large-scale activities are organized, during a short term, high weights, e.g., 550, 450, or any other suitable weight, can be set for anchor accounts related to the activities.

An anchor can also be referred to as an artist, and can be a person who plays back video or audio in a webcast room. An anchor account can be an account that plays video or audio in a webcast room. The anchor account can send video data or audio data to the server via a login terminal of the anchor account. The server can then forward the video data or audio data in real time to the login terminals of other accounts in the webcast room. Generally, a webcast room can be configured to have one online anchor account. In various embodiments, a login terminal can refer to a terminal device via which a user logs in an account to access any suitable services provided by the server or the terminal, the services including, e.g., displaying webcast rooms, accessing a webcast room, etc.

The exemplary method depicted in FIG. 1 can be further detailed in the following example. In Step 101, pre-stored weights corresponding to webcast rooms and pre-stored anchor-account weights of the webcast rooms are obtained.

An anchor account of a webcast room can include a last-online anchor account in the webcast room that is not offline or that has an offline time not exceeding a preset first time length threshold (e.g., about 5 minutes). In various embodiments, a last-online anchor account can refer to an anchor account that is the most recently online in a webcast room. 'Online' can also be referred to as 'on microphone'. An offline time can refer to a time length for which a user (e.g., an anchor account) has been offline since the most recent log-off.

Thus, for example, when there is an online anchor account in the webcast room, the anchor account of the webcast room can be the online anchor account. When the webcast room is in an anchor-offline state, and has been in the anchor-offline state for a time length not exceeding the preset first time length threshold, the anchor account of the webcast room can be a last-online anchor account of the webcast room. In various embodiments, an anchor-offline state can refer to a status of a webcast room having no online anchor account. An anchor-online state can refer to a status of a webcast room having an online anchor account. When the webcast room is in the anchor-offline state, and has been in the anchor-offline state for a time length exceeding the preset first time length threshold, i.e., the last-online anchor account of the webcast room has an offline time exceeding the preset first time length threshold, the anchor account of the webcast room is vacant.

Optionally, a trigger condition can be set for the process of the method as disclosed in accordance with various embodiments. When the trigger condition is met, the process can be executed. Optionally, the trigger condition can include reaching a preset time cycle (i.e., a periodic trigger). For example, Step 101 can include obtaining the pre-stored weights corresponding to the webcast rooms and the pre-stored anchor-accounts weights of the webcast rooms, based on the preset time cycle. Thus, each time when the preset time cycle is reached (i.e. each time when the preset time cycle has elapsed), the server can execute the process for displaying the webcast rooms, i.e., generating a webcast-room-recommendation list to send to terminals.

In addition to the periodic trigger, the process can be triggered using other trigger conditions. For example, the process can be triggered by an anchor account newly getting online in a webcast room, by an administrator via system instruction, by a list-obtaining-request sent by a terminal, etc.

Optionally, the webcast rooms in the process in accordance with various disclosed embodiments can include the webcast rooms that are in a video mode or that have a video-off-mode time not exceeding a preset second time length threshold (e.g., about 5 minutes). A video-off-mode time can refer to a time length from a most recent ending of the video mode. Modes of the webcast rooms can include a video mode (e.g., video anchor mode, game live mode, etc.), a non-video mode (e.g., audio mode, etc.). The mode of a webcast room can be pre-defined or be set by a room administrator. A second time length threshold and the first time length threshold can be equal or not equal.

Thus, in the process in accordance with various disclosed embodiments, the webcast rooms to be displayed can be selected from the webcast rooms that are in the video mode or that have the video-off-mode time not exceeding the preset second time length threshold. The webcast rooms that have the video-off-mode time exceeding the preset second time length threshold are not processed or displayed. Because the webcast rooms that are in the video mode can receive relatively great attention, settings as described above in various embodiments can improve matching between displayed webcast rooms and user needs.

Optionally, the webcast rooms in the process in accordance with various disclosed embodiments can include the webcast rooms that are in an anchor-online state, or have been in the anchor-offline state for a time length not exceeding the preset first time length threshold. The anchor accounts of the webcast room can be a last-online anchor account of the webcast MOM.

Thus, in the process in accordance with various disclosed embodiments, the webcast rooms to be displayed can be selected from the webcast rooms that are in the anchor-online state, or have been in the anchor-offline state for a time length not exceeding the preset first time length threshold. The webcast rooms that have been in the anchor-offline state for a time length exceeding the preset first time length threshold are not processed or displayed. When a webcast room has been in the anchor-offline state for a long time length, it may indicate that webcast (or live broadcast) has ended. A user may leave soon after entering such a webcast room. Therefore, settings as described above in various embodiments can reduce waste of network resources and server resources.

In Step 102, according to the weights corresponding to the webcast rooms and the anchor-account weights of the webcast rooms, webcast room(s) to be displayed are determined from the webcast rooms. The webcast rooms to be displayed can refer to webcast rooms that are prepared in order to be displayed.

Step 102 can be processed in various ways. For example, for each webcast room, a total weight of the webcast room can be obtained by adding the weight corresponding to the webcast room and the anchor-account weight of the webcast room. The webcast room having a total weight exceeding a preset weight threshold can be the webcast room for displaying. Optionally, Step 102 can be processed using the following steps.

Figure 2:
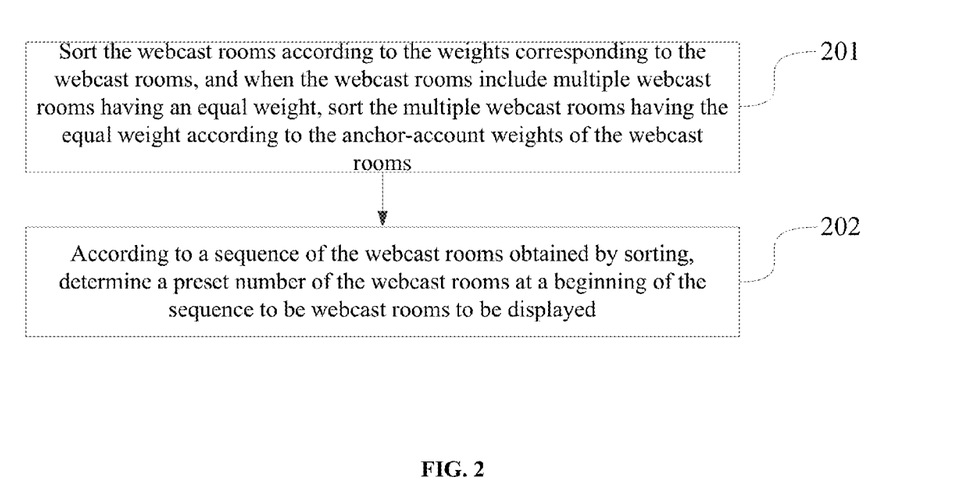
FIG. 2 depicts a flow diagram of another exemplary method for displaying webcast rooms in accordance with various disclosed embodiments.

In Step 201, the webcast rooms are sorted according to the weights (i.e., magnitude of the weights) corresponding to the webcast rooms. When there are multiple webcast rooms having an equal weight among the webcast rooms, the multiple webcast rooms having the equal weight can be sorted according to anchor-account weights of the webcast rooms.

For example, when the webcast rooms are sorted, the webcast rooms can be sorted in a descending order of the weights. The webcast rooms having greater weights can be sorted at a beginning of a sequence, and the webcast rooms having lower weights can be sorted at an end of the sequence. The preset weights corresponding to the webcast rooms can be unequal or equal. When the webcast rooms are sorted, the multiple webcast rooms having the equal weight can be sorted in a descending order of the anchor-account weights of the webcast rooms. Thus, among the multiple webcast rooms having the equal weight, the webcast rooms having greater anchor-account weights can be sorted to precede the webcast rooms having lower anchor-account weights.

Optionally, the server can pre-store a webcast-room list containing at least one webcast room. The webcast-room list can also be referred to as a webcast-room whitelist. Based on the webcast-room list, in Step 201, the webcast rooms in the webcast-room list can be sorted and displayed. For example, the webcast rooms in the webcast-room list can be sorted according to the weights corresponding to the webcast rooms. When the webcast-room list contains multiple webcast rooms having an equal weight, the multiple webcast rooms having the equal weight can be sorted according to the anchor-account weights of the webcast rooms.

The preset weights corresponding to the anchor accounts of the webcast rooms can be unequal or equal. When the multiple webcast rooms having an equal weight (i.e., an equal weight of the webcast rooms) include multiple webcast rooms having an equal anchor-account weight, the multiple webcast rooms having an equal weight and an equal anchor-account weight can be sorted according to respective numbers of online accounts of the webcast rooms, e.g., sorted in a descending order of the number of online accounts such that a webcast room having a greater number of online accounts can precede a webcast room having a smaller number of online accounts in the sequence.

Based on the webcast-room list, in Step 201, the webcast rooms in the webcast-room list can be sorted in more beginning positions of the sequence, i.e. sorted to precede the webcast rooms out of (i.e., not from) the webcast-room list. In one embodiment, to simplify the operation of setting weights, weights can be set for the webcast rooms in the webcast-room list and not for the webcast rooms out of the webcast-room list.

In various embodiments, the webcast rooms in the webcast-room list can be sorted using the processing methods as described above. The webcast rooms out of the webcast-room list can be sorted using processing methods including, e.g., sorting according to the anchor-account weights of the webcast rooms.

Some of the anchor accounts of the webcast rooms may have an equal weight. Optionally, when the webcast rooms out of the webcast-room list include multiple webcast rooms having an equal anchor-account weight, the multiple webcast rooms having the equal anchor-account weight can be sorted according to respective numbers of online accounts of the webcast rooms. In this case, the sorting can be the same or similar to the corresponding processing methods as described above in various embodiments. More online accounts can indicate better matching between the webcast room and user needs. Thus, the sorting as described above can improve matching between the displayed webcast rooms and user needs.

In Step 202, according to the sequence of the webcast rooms obtained by sorting, a preset number of the webcast rooms at a beginning of a sequence (e.g., generated by sorting) are determined to be webcast rooms to be displayed. For example, after the webcast rooms are sorted in accordance with various disclosed embodiments (e.g., as shown in Step 201), a preset number (e.g., 20) of the webcast rooms at the beginning of the sequence can be selected from the sequence.

Optionally, the server can pre-store an account list containing at least one anchor account. The account list can also be referred to as an account whitelist. In one embodiment, the webcast rooms having respective anchor accounts in the account list can be displayed. That is, the webcast rooms processed in the method as disclosed in various embodiments can include the webcast rooms having the respective anchor accounts in the account list, i.e., the webcast rooms for the one or more anchor accounts contained in the account list. To simplify the operation of setting weights, weights can be set for the anchor accounts in the account list and not for the anchor accounts out of the account list.

In Step 103, the webcast room(s) to be displayed are displayed. For example, the server can send display information (e.g., room identifier, room icon, room name, etc.) of the webcast rooms to a terminal. The terminal can then display, on a recommendation window, the webcast rooms to be displayed.

Figure 3:
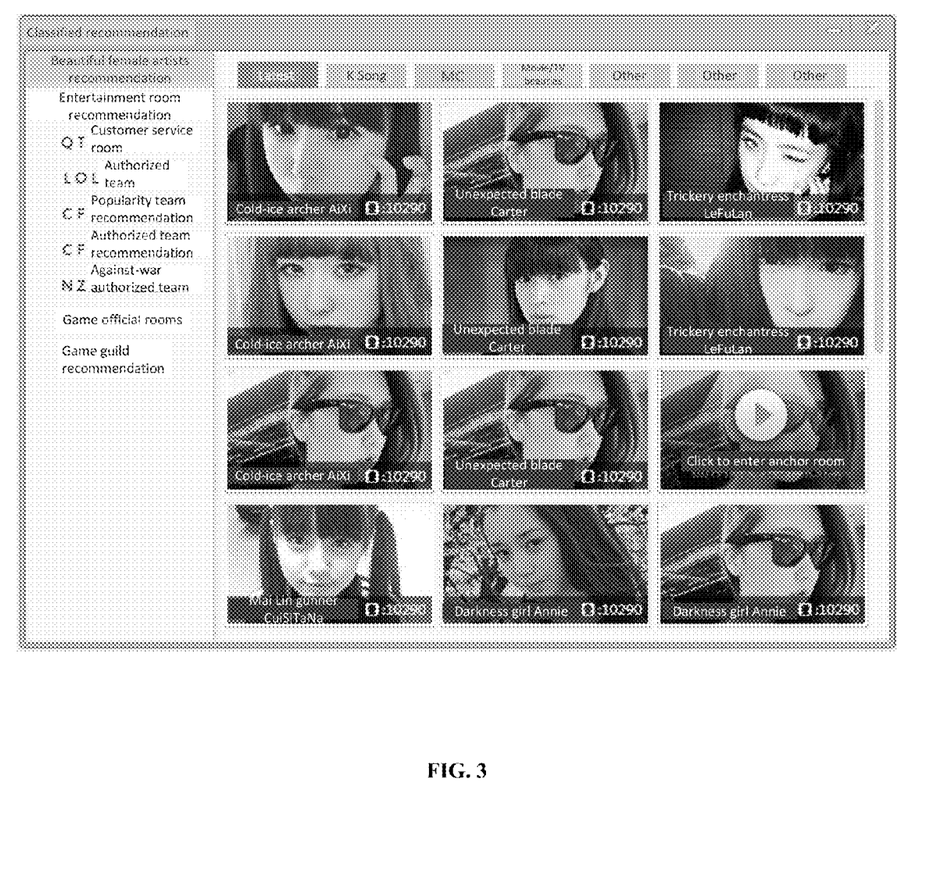
FIG. 3 depicts an exemplary recommendation window for webcast rooms in accordance with various disclosed embodiments.

Optionally, the server can display the webcast rooms to be displayed according to the sequence of the webcast rooms obtained by sorting. For example, the server can determine respective sequence information (e.g., sequence number) of the webcast rooms according to the sequence of the webcast rooms obtained by sorting. Next, the sequence information and the display information of the webcast rooms to be displayed can be sent to the terminal. The display information can include, e.g., name of the anchor, image related to the webcast room or the anchor, or any other suitable information to be displayed. According to the sequence information, the terminal can then display in sequence, on a recommendation window, the webcast rooms to be displayed. For example, FIG. 3 depicts an exemplary recommendation window for webcast rooms in accordance with various disclosed embodiments.

In various embodiments, according to pre-stored weights corresponding to the webcast rooms and pre-stored anchor-account weights of the webcast rooms, webcast room(s) to be displayed can be determined from the webcast rooms and can be displayed. Thus, a webcast-room-recommendation list can be timely updated according to the anchor accounts of the webcast rooms. Frequency of users' entering and exiting the webcast rooms can be reduced, thus reducing waste of network resources and server resources.

Figure 4:
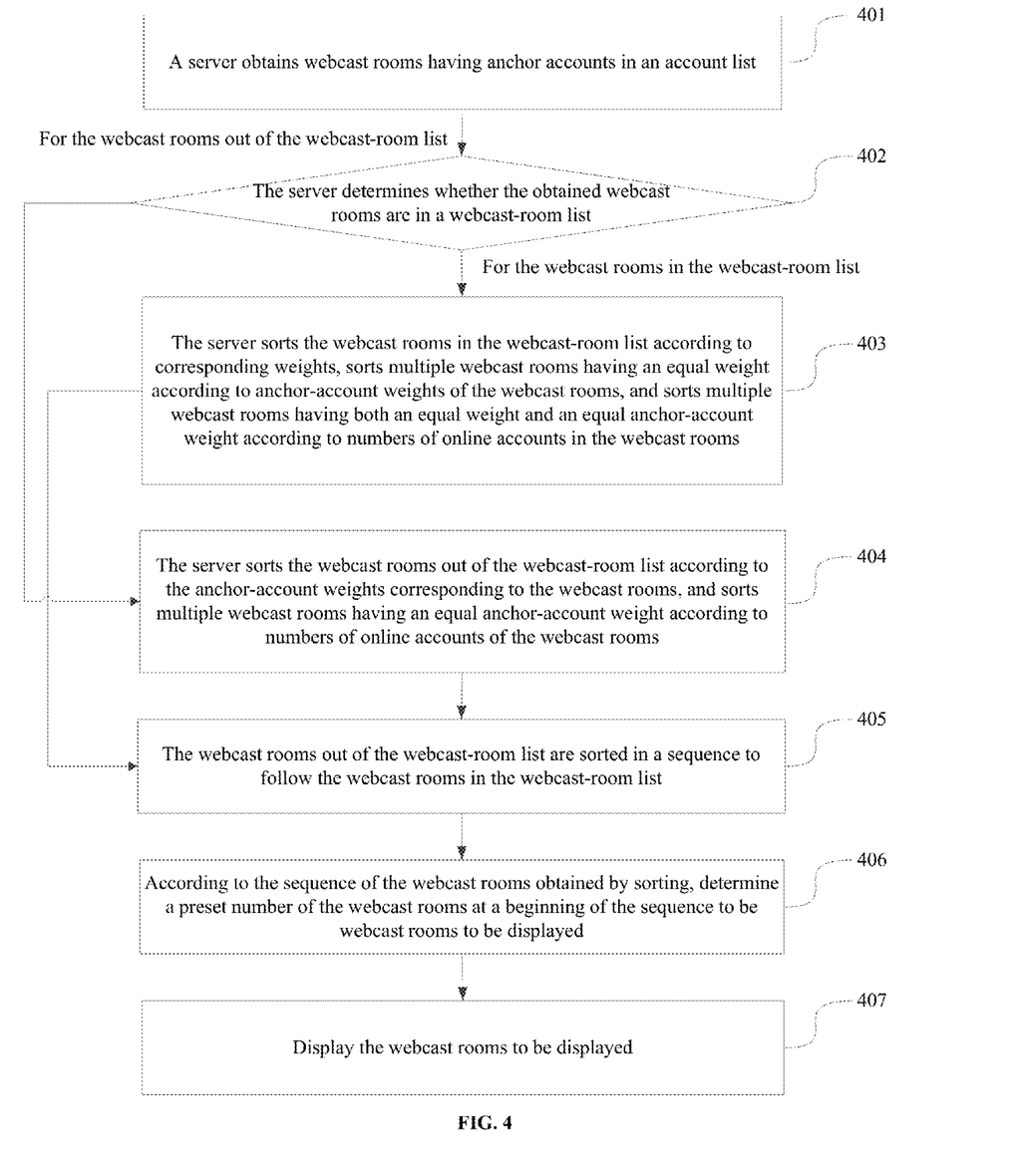
FIG. 4 depicts a flow diagram of another exemplary method for displaying webcast rooms in accordance with various disclosed embodiments.

The methods for displaying webcast rooms in accordance with various disclosed embodiments can be illustrated in further details in application scenarios. In an exemplary application scenario, assuming that a server has established 8 webcast rooms respectively referred to as A, B, C, D, E, F, G, and H. In this case, the process to implement the methods can be illustrated in FIG. 4. FIG. 4 depicts a flow diagram of another exemplary method for displaying webcast rooms in accordance with various disclosed embodiments.

In Step 401, the server obtains webcast rooms having anchor accounts in an account list. Assuming the anchor account(s) of H is not in the account list, then H can be filtered out and not processed subsequently.

In Step 402, the server determines whether the obtained webcast rooms are in a webcast-room list. For the webcast rooms in the webcast-room list, Step 403 can be performed. For the webcast rooms out of the webcast-room list, Step 404 can be performed. For example, it can be assumed that A, B, C, and D are in the webcast-room list, and E, F, and G are out of the webcast-room list.

In Step 403, the server sorts the webcast rooms in the webcast-room list according to corresponding weights. When there are multiple webcast rooms having an equal weight among the webcast rooms in the webcast-room list, the multiple webcast rooms having the equal weight can be sorted according to anchor-account weights of the webcast rooms. When among the multiple webcast rooms having the equal weight, there are multiple webcast rooms having an equal anchor-account weight, the webcast rooms having both the equal weight and the equal anchor-account weight can be sorted according to numbers of online accounts in the webcast rooms. For example, assuming a relationship between the weights corresponding to A, B, C, and D is A=B=C>D (e.g., assuming that the weights of A, B, C and D are 200, 200, 200 and 100, respectively), and a relationship between the weights corresponding to the anchor accounts of A, B, and C is A=B>C (e.g., assuming the weights of the anchor accounts of A, B, and C are 500, 500, and 100, respectively), and a relationship between the numbers of online accounts of A and B is A=B, the sequence of A, B, C and D can be B, A, C, and D, after the sorting.

In Step 404, the server sorts the webcast rooms out of the webcast-room list according to the anchor-account weights of the webcast rooms. When the webcast rooms out of the webcast-room list include multiple webcast rooms having an equal anchor-account weight, the multiple webcast rooms having the equal anchor-account weight can be sorted according to numbers of online accounts of the webcast rooms. For example, assuming a relationship between the anchor-account weights of E, F, and G is E=F>G (e.g., assuming the anchor-account weights of E, F, and G are 500, 500, and 100, respectively), and a relationship between the numbers of online accounts of E and F is F>E, the sequence of E, F, and G can be F, E, and G.

There is not necessarily any timing sequence between Step 403 and Step 404. In Step 405, the webcast rooms out of the webcast-room list are sorted to follow the webcast rooms in the webcast-room list. The sequence of A, B, C, D, E, F, G, and H can be B, A, C, D, F, E, and G.

In Step 406, according to the sequence of the webcast rooms obtained by sorting, a preset number of the webcast rooms at a beginning of a sequence (i.e., the sequence generated by sorting) are determined to be webcast rooms to be displayed. In Step 407, the webcast rooms to be displayed are displayed.

In various embodiments, according to pre-stored weights corresponding to the webcast rooms and pre-stored anchor-account weights of the webcast rooms, webcast room(s) to be displayed can be determined from the webcast rooms and can be displayed. Thus, a webcast-room-recommendation list can be timely updated according to the anchor accounts of the webcast rooms. Frequency of users' entering and exiting the webcast rooms can be reduced, thus reducing waste of network resources and server resources.

Figure 5:
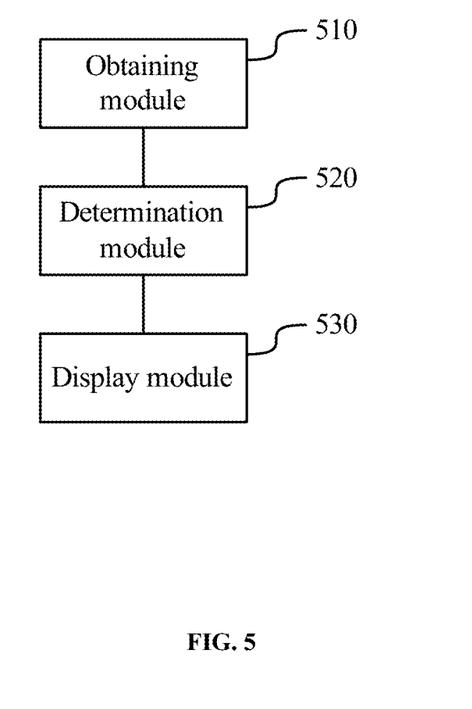
FIG. 5 depicts a structure diagram of an exemplary apparatus for displaying webcast rooms in accordance with various disclosed embodiments.

Various embodiments further provide apparatus for displaying webcast rooms. For example, FIG. 5 depicts a flow diagram of an exemplary apparatus for displaying webcast rooms in accordance with various disclosed embodiments. The apparatus can include an obtaining module 510, a determination module 520, and/or a display module 530. Certain modules may be omitted and other modules can be included.

The obtaining module 510 is configured to obtain pre-stored weights corresponding to webcast rooms and pre-stored anchor-account weights of the webcast rooms. The determination module 520 is configured to determine webcast rooms to be displayed from the webcast rooms, according to the weights corresponding to the webcast rooms and the anchor-account weights of the webcast rooms. The display module 530 is configured to display the webcast rooms to be displayed.

Optionally, the obtaining module 510 is configured to obtain the pre-stored weights corresponding to the webcast rooms and the pre-stored anchor-account weights of the webcast rooms, based on a preset time cycle. Optionally, the webcast rooms include the webcast rooms that are in a video mode or that have a video-off-mode time not exceeding a preset second time length threshold.

Optionally, the webcast rooms include the webcast rooms that are in an anchor-online state, or have been in an anchor-offline state for a time length not exceeding a preset first time length threshold. In various embodiments, an anchor account of a webcast room can include a last-online anchor account in the webcast room.

Optionally, the determination module 520 is configured to sort the webcast rooms according to the weights corresponding to the webcast rooms. When, among the webcast rooms, there are multiple webcast rooms having an equal weight, the multiple webcast rooms having the equal weight can be sorted according to the anchor-account weights of the webcast rooms. According to the sequence of the webcast rooms obtained by sorting, a preset number of the webcast rooms at a beginning of a sequence are determined to be webcast rooms to be displayed.

Optionally, the determination module 520 is further configured to pre-store a webcast-room list containing at least one webcast room. The determination module 520 is thus configured to sort the webcast rooms in the webcast-room list according to the weights corresponding to the webcast rooms. When the webcast-room list contains multiple webcast rooms having an equal weight, the multiple webcast rooms having the equal weight can be sorted according to the anchor-account weights of the webcast rooms.

Optionally, the determination module 520 is further configured to sort the webcast rooms out of the webcast-room list according to the anchor-account weights of the webcast rooms. The webcast rooms out of the webcast-room list can be sorted in the sequence to follow the webcast rooms in the webcast-room list.

Optionally, when multiple web cast rooms having an equal weight (i.e., among the webcast rooms in the webcast-room list) further include multiple webcast rooms having an equal anchor-account weight, the determination module 520 is further configured to sort the multiple webcast rooms having an equal weight of the webcast rooms and an equal anchor-account weight according to numbers of online accounts. When the webcast rooms out of the webcast-room list include multiple webcast rooms having an equal anchor-account weight, the multiple webcast rooms out of the webcast-room list and having the equal anchor-account weight can be sorted according to numbers of online accounts of the webcast rooms.

Optionally, the determination module 520 is further configured to pre-store an account list containing at least one anchor account. The webcast rooms can include the webcast rooms that have anchor accounts contained in the account list.

Optionally, the display module 530 is configured to display the webcast rooms to be displayed according to the sequence of the webcast rooms obtained by sorting.

In various embodiments, according to pre-stored weights corresponding to the webcast rooms and pre-stored anchor-account weights of the webcast rooms, webcast room(s) to be displayed can be determined from the webcast rooms and can be displayed. Thus, a webcast-room-recommendation list can be timely updated according to the anchor accounts of the webcast rooms. Frequency of users' entering and exiting the webcast rooms can be reduced, thus reducing waste of network resources and server resources.

The displaying of webcast room using the apparatus for displaying webcast rooms provided by various disclosed embodiments is merely illustrated by the above functional modules. In practical applications, the above functions can be allocated to be completed by different functional modules. That is, the internal structure of the apparatus can be divided into different functional blocks in order to accomplish all or part of the functions described above. In addition, the apparatus for displaying webcast rooms and the methods for displaying webcast rooms in accordance with various disclosed embodiments are from a similar or same concept.

Part or all of the steps in the methods in accordance with various embodiments can be accomplished by using hardware, or using a program/software to instruct related hardware. The program/software can be stored in a non-transitory computer-readable storage medium including, e.g., ROM/RAM, magnetic disk, optical disk, etc.

The embodiments disclosed herein are exemplary only. Other applications, advantages, alternations, modifications, or equivalents to the disclosed embodiments are obvious to those skilled in the art and are intended to be encompassed within the scope of the present disclosure.

INDUSTRIAL APPLICABILITY AND ADVANTAGEOUS EFFECTS

Without limiting the scope of any claim and/or the specification, examples of industrial applicability and certain advantageous effects of the disclosed embodiments are listed for illustrative purposes. Various alternations, modifications, or equivalents to the technical solutions of the disclosed embodiments can be obvious to those skilled in the art and can be included in this disclosure.

The disclosed methods and apparatus can be used in a variety of Internet applications. By using the disclosed methods and apparatus, a weight corresponding to each webcast room of a plurality of webcast rooms and an anchor-account weight corresponding to an anchor account of the each webcast room of the plurality of webcast rooms can be obtained. The weight corresponding to the each webcast room and the anchor-account weight can be pre-stored. A webcast room to be displayed can be determined from the plurality of webcast rooms, according to the weight corresponding to the each webcast room and the anchor-account weight. The webcast room to be displayed can thus be displayed.

Therefore, according to the weights corresponding to the webcast rooms and the anchor-account weights of the webcast rooms, webcast rooms to be displayed can be determined from the webcast rooms and can be displayed. Thus, a webcast-room-recommendation list can be timely updated according to the anchor accounts of the webcast rooms. Because pre-stored lists and weights can be used, the updating of the webcast-room-recommendation list can be easy and does not require significant work by staff. A webcast room having a great weight or having an anchor account with a great weight is more likely to be included in the webcast-room-recommendation list. Matching between displayed webcast rooms and user needs can be improved. Frequency of users' entering and exiting the webcast rooms can be reduced, thus reducing waste of network resources and server resources.

What is claimed is:

1. A method for displaying webcast rooms on a client terminal, implemented by the client terminal and a server each having a computer system including one or more processors and a memory, comprising:
 obtaining, by the server, a weight corresponding to each webcast room of a plurality of webcast rooms and an anchor-account weight corresponding to an anchor account of the each webcast room of the plurality of webcast rooms, wherein inside a first webcast room of the plurality of webcast rooms, when a user with an anchor account of the first webcast room sends a video data or an audio data via a login terminal of the anchor account to the server, the server forwards the video data or the audio data in real time to login terminals of other accounts in the first webcast room, and login terminals of user accounts in a second webcast room do not receive the video data or the audio data corresponding to the first webcast room;

determining, by the server, one or more webcast rooms to be displayed from the plurality of webcast rooms, and a display sequence of the one or more webcast rooms, according to the weight corresponding to the each webcast room and the anchor-account weight, wherein the anchor-account weight of an anchor account is associated with a popularity of the anchor account, the popularity being calculated based on ratings and reviews of the anchor account, a number of online users corresponding to the anchor account, and a number of gifts sent to the anchor account by the online users; and displaying, by the client terminal, one or more display information corresponding to the one or more webcast rooms to be displayed in the determined display sequence on a recommendation window on the client terminal, wherein each display information includes an image related to one of the corresponding webcast room and an anchor of the corresponding webcast room.

2. The method according to claim 1, wherein the obtaining of the weight corresponding to the each webcast room and the anchor-account weight includes:

obtaining the weight corresponding to the each webcast room and the anchor-account weight based on a preset time cycle.

3. The method according to claim 1, wherein the each webcast room is a webcast room that is in a video mode or that has a time length from ending the video mode not exceeding a preset second time length threshold, wherein the video mode indicates that the anchor account of the webcast room is actively sending the video data in real time.

4. The method according to claim 1, wherein:

the each webcast room is a webcast room that is in an anchor-online state or that has a time length for an anchor-offline state not exceeding a preset first time length threshold; and the anchor account of the each webcast room is a last-online anchor account of the each webcast room.

5. The method according to claim 1, wherein the determining of the one or more webcast rooms to be displayed from the plurality of webcast rooms, and the sequence of the one or more webcast rooms includes:

sorting the plurality of webcast rooms according to weights corresponding to the plurality of webcast rooms;

when the plurality of webcast rooms include multiple webcast rooms having an equal weight, sorting the multiple webcast rooms having the equal weight according to anchor-account weights corresponding to the multiple webcast rooms having the equal weight; and according to a sorted sequence of the plurality of webcast rooms, determining that a preset number of webcast rooms sorted in a beginning of the sorted sequence are the one or more webcast rooms to be displayed, and determining the display sequence of the one or more webcast rooms to be displayed based on the sorted sequence.

6. The method according to claim 5, further including:

pre-storing a webcast-room list containing at least two webcast rooms, wherein the sorting of the plurality of webcast rooms according to the weights corresponding to the plurality of webcast rooms, and the sorting of the multiple webcast rooms having the equal weight include:

sorting the at least two webcast rooms in the webcast-room list according to the weights corresponding to the at least two webcast rooms in the webcast-room list; and when the webcast-room list contains the multiple webcast rooms having the equal weight, sorting the multiple webcast rooms having the equal weight in the webcast-room list according to the anchor-account weights corresponding to the multiple webcast rooms having the equal weight in the webcast-room list.

7. The method according to claim 6, further including:

sorting webcast rooms not included in the webcast-room list according to the anchor-account weights corresponding to the webcast rooms not included in the webcast-room list; and in the sorted sequence of the plurality of webcast rooms, placing the sorted webcast rooms not included in the webcast-room list to follow the at least two webcast rooms in the webcast-room list.

8. The method according to claim 7, further including:

when, among the at least two webcast rooms in the webcast-room list, the multiple webcast rooms having the equal weight include multiple webcast rooms having an equal anchor-account weight, sorting the multiple webcast rooms having the equal anchor-account weight and having the equal weight in the webcast-room list according to a number of online accounts inside each of the multiple webcast rooms; and when the webcast rooms not included in the webcast-room list include multiple webcast rooms having an equal anchor-account weight, sorting the multiple webcast rooms having the equal anchor-account weight not included in the webcast-room list according to a number of online accounts inside each of the multiple webcast rooms.

9. The method according to claim 5, further including pre-storing an account list containing one or more anchor accounts, wherein the plurality of webcast rooms are webcast rooms for the one or more anchor accounts contained in the account list.

10. An apparatus for displaying webcast rooms, comprising at least one processor, a memory, and a plurality of program modules stored in the memory and to be executed by the at least one processor, the plurality of program modules comprising:

an obtaining module configured to obtain a weight corresponding to each webcast room of a plurality of webcast rooms and an anchor-account weight corresponding to an anchor account of the each webcast room of the plurality of webcast rooms, wherein inside a first webcast room of the plurality of webcast rooms, when a user with an anchor account of the first webcast room sends a video data or an audio data via a login terminal of the anchor account to a server, the server forwards the video data or the audio data in real time to login terminals of other accounts in the first webcast room, and login terminals of user accounts in a second webcast room do not receive the video data or the audio data corresponding to the first webcast room;

a determination module configured to determine one or more webcast rooms to be displayed from the plurality of webcast rooms, and a display sequence of the one or more webcast rooms, according to the weight corresponding to the each webcast room and the anchor-account weight, wherein the anchor-account weight of an anchor account is associated with a popularity of the anchor account, the popularity being calculated based on ratings and reviews of the anchor account, a number of online users corresponding to the anchor account, and a number of gifts sent to the anchor account by the online users; and a display module configured to display one or more display information corresponding to the one or more webcast rooms to be displayed in the determined display sequence on a recommendation window on a client terminal, wherein each display information includes an image related to one of the corresponding webcast room and an anchor of the corresponding webcast room.

11. The apparatus according to claim 10, wherein the obtaining module is further configured to:
obtain the weight corresponding to the each webcast room and the anchor-account weight based on a preset time cycle.

12. The apparatus according to claim 10, wherein the each webcast room is a webcast room that is in a video mode or that has a time length from ending the video mode not exceeding a preset second time length threshold, wherein the video mode indicates that the anchor account of the webcast room is actively sending the video data in real time.

13. The apparatus according to claim 10, wherein:
the each webcast room is a webcast room that is in an anchor-online state or that has a time length for an anchor-offline state not exceeding a preset first time length threshold; and
the anchor account of the each webcast room is a last-online anchor account of the each webcast room.

14. The apparatus according to claim 10, wherein the determination module is configured to:
sort the plurality of webcast rooms according to weights corresponding to the plurality of webcast rooms;
when the plurality of webcast rooms include multiple webcast rooms having an equal weight, sort the multiple webcast rooms having the equal weight according to anchor-account weights corresponding to the multiple webcast rooms having the equal weight; and
according to a sorted sequence of the plurality of webcast rooms, determine that a preset number of webcast rooms sorted in a beginning of the sorted sequence are the one or more webcast rooms to be displayed, and determining the display sequence of the one or more webcast rooms to be displayed based on the sorted sequence.

15. The apparatus according to claim 14, wherein the determination module is further configured to:
pre-store a webcast-room list containing at least two webcast rooms;
sort the at least two webcast rooms in the webcast-room list according to the weights corresponding to the at least two webcast rooms in the webcast-room list; and
when the webcast-room list contains the multiple webcast rooms having the equal weight, sort the multiple webcast rooms having the equal weight in the webcast-room list according to the anchor-account weights corresponding to the multiple webcast rooms having the equal weight in the webcast-room list.

16. The apparatus according to claim 15, wherein the determination module is further configured to:
sort webcast rooms not included in the webcast-room list according to the anchor-account weights corresponding to the webcast rooms not included in the webcast-room list; and
in the sorted sequence of the plurality of webcast rooms, place the sorted webcast rooms not included in the webcast-room list to follow the at least two webcast rooms in the webcast-room list.

17. The apparatus according to claim 16, wherein the determination module is further configured to:
when, among the at least two webcast rooms in the webcast-room list, the multiple webcast rooms having the equal weight include multiple webcast rooms having an equal anchor-account weight, sort the multiple webcast rooms having the equal anchor-account weight and having the equal weight in the webcast-room list according to a number of online accounts inside each of the multiple webcast rooms; and
when the webcast rooms not included in the webcast-room list include multiple webcast rooms having an equal anchor-account weight, sort the multiple webcast rooms having the equal anchor-account weight not included in the webcast-room list according to a number of online accounts inside each of the multiple webcast rooms.

18. The apparatus according to claim 14, wherein the determination module is further configured to:
pre-store an account list containing one or more anchor accounts, wherein the plurality of webcast rooms are webcast rooms for the one or more anchor accounts contained in the account list.

19. The method according to claim 1, further comprising:
when the image related to the corresponding webcast room or the image related to the anchor of the corresponding webcast room is selected, the client terminal entering into the corresponding webcast room and receiving the video data or the audio data produced by the anchor account in the corresponding webcast room via the server.

20. The method according to claim 1, wherein:
the each display information presented on the recommendation window further includes a number of online accounts receiving the video data or the audio data sent by the anchor account in the corresponding webcast room.

* * * * *